(12) United States Patent
Schmieder

(10) Patent No.: US 10,604,987 B2
(45) Date of Patent: Mar. 31, 2020

(54) METHOD FOR MACHINING A WORKPIECE

(71) Applicant: HOMAG GMBH, Schopfloch (DE)

(72) Inventor: Volker Schmieder, Mössingen (DE)

(73) Assignee: HOMAG GMBH, Schopfloch (DE)

( * ) Notice: Subject to any disclaimer, the term of this patent is extended or adjusted under 35 U.S.C. 154(b) by 233 days.

(21) Appl. No.: 15/553,621

(22) PCT Filed: Mar. 15, 2016

(86) PCT No.: PCT/EP2016/005551
§ 371 (c)(1),
(2) Date: Aug. 25, 2017

(87) PCT Pub. No.: WO2016/146614
PCT Pub. Date: Sep. 22, 2016

(65) Prior Publication Data
US 2018/0051504 A1 Feb. 22, 2018

(30) Foreign Application Priority Data
Mar. 17, 2015 (DE) .................. 10 2015 204 832

(51) Int. Cl.
| | |
|---|---|
| B27C 5/00 | (2006.01) |
| B27M 3/00 | (2006.01) |
| E06B 3/00 | (2006.01) |
| E06B 3/10 | (2006.01) |
| E06B 3/56 | (2006.01) |
| B27M 3/18 | (2006.01) |
| B29C 65/48 | (2006.01) |

(Continued)

(52) U.S. Cl.
CPC .............. *E06B 3/10* (2013.01); *B27M 3/00* (2013.01); *B27M 3/18* (2013.01); *B29C 65/48* (2013.01); *E06B 3/20* (2013.01); *E06B 3/56* (2013.01); *B27C 5/00* (2013.01); *B27C 9/00* (2013.01); *B29L 2031/005* (2013.01)

(58) Field of Classification Search
None
See application file for complete search history.

(56) References Cited

U.S. PATENT DOCUMENTS

| | | | | |
|---|---|---|---|---|
| 4,050,489 A | * | 9/1977 | Werner | ................ B27M 3/0013 144/350 |
| 4,394,409 A | * | 7/1983 | Hertel | ..................... B27B 33/20 138/157 |
| 4,799,981 A | | 1/1989 | Stone et al. | |

FOREIGN PATENT DOCUMENTS

| | | |
|---|---|---|
| CH | 554 479 A | 9/1974 |
| CN | 2583332 Y | 10/2003 |

(Continued)

OTHER PUBLICATIONS

International Search Report, PCT/EP2016/055512, dated Jun. 7, 2016, 2 pgs.

(Continued)

*Primary Examiner* — Jeffry H Aftergut
(74) *Attorney, Agent, or Firm* — Paul D. Strain, Esq.; Strain & Strain PLLC

(57) ABSTRACT

The invention relates to a method for machining a workpiece, in particular for a profiled leaf element of a window leaf frame, wherein the workpiece is initially machined using a first machining device in order to create a machined first surface to which an adhesive tape is to be applied, and the workpiece is further machined once the adhesive tape has been applied.

14 Claims, 2 Drawing Sheets

(51) Int. Cl.
*E06B 3/20* (2006.01)
*B27C 9/00* (2006.01)
*B29L 31/00* (2006.01)

(56) References Cited

FOREIGN PATENT DOCUMENTS

| CN | 201198703 Y | | 2/2009 |
|---|---|---|---|
| DE | 689 04 098 T2 | | 4/1993 |
| DE | 20 2007 019 400 U1 | | 4/2012 |
| DE | 10 2012 005 445 A1 | | 9/2013 |
| EP | 421836 A1 | * | 4/1991 |
| EP | 2 253 441 A1 | | 11/2010 |
| GB | 1 392 734 A | | 4/1975 |
| JP | 2013-71253 A | | 4/2013 |

OTHER PUBLICATIONS

German Search Report, Appl. No. 10 2015 204 832.2, dated Dec. 1, 2015, 8 pgs.

* cited by examiner

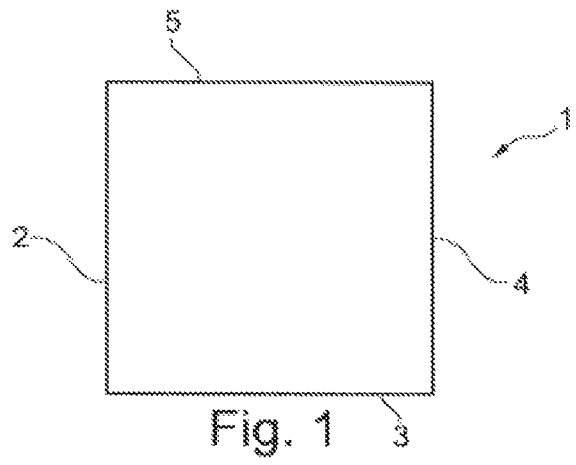
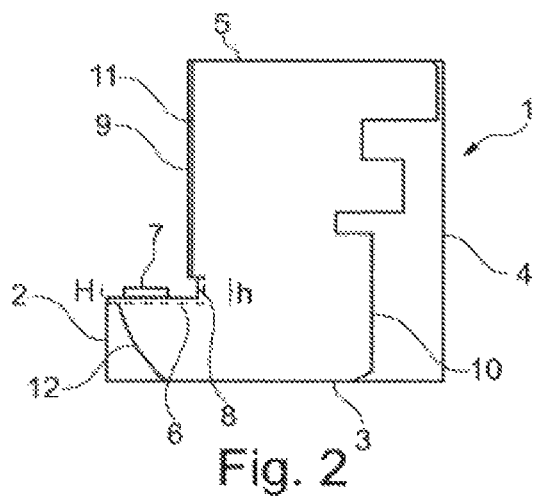
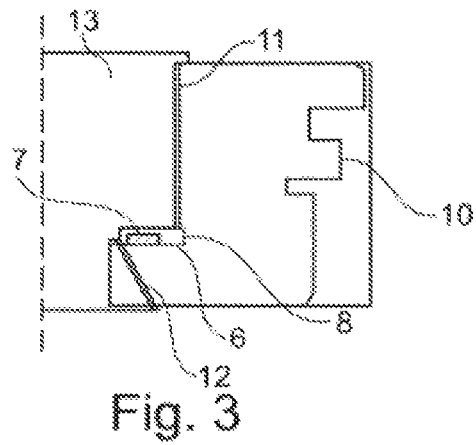

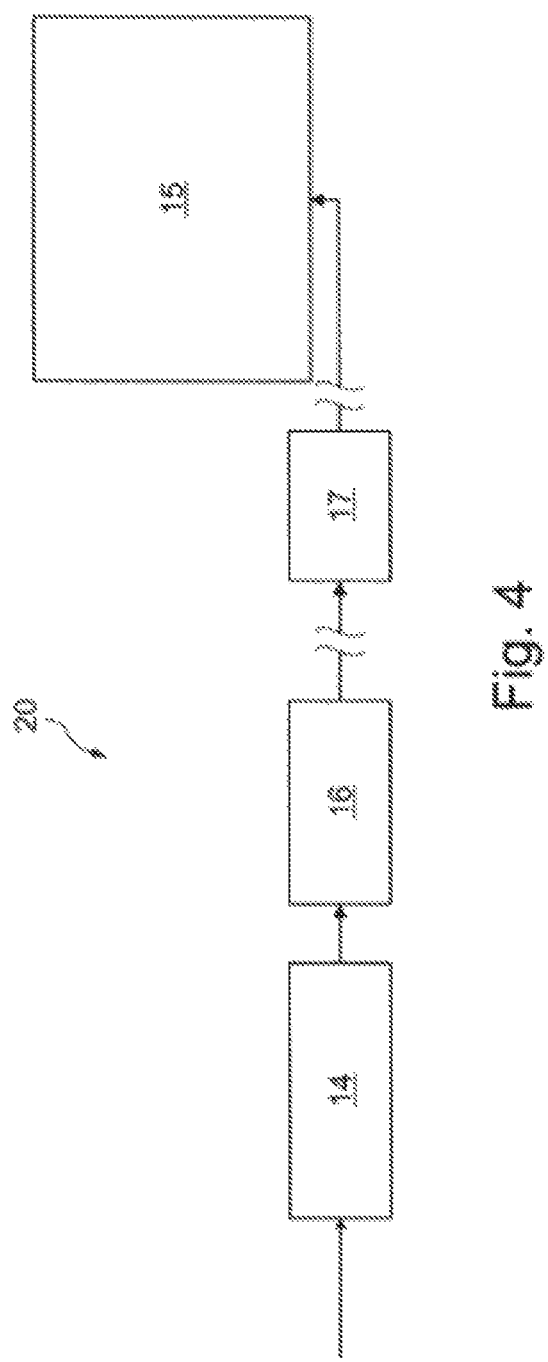

METHOD FOR MACHINING A WORKPIECE

CROSS-REFERENCE TO RELATED PATENT APPLICATIONS

This application is a National Stage of International Application No. PCT/EP2016/055512, filed Mar. 15, 2016, which is based upon and claims the benefit of priority from prior German Patent Application No. 10 2015 204 832.2, filed Mar. 17, 2015, the entire contents of all of which are incorporated herein by reference in their entirety.

TECHNICAL FIELD

The invention relates to a method for machining a workpiece, in particular a limb of a window leaf frame, from wood, wood materials, plastic or the like.

PRIOR ART

The element of a window that is movable and usually to be opened, the window leaf, usually comprises a window leaf frame and a pane inserted therein. The window leaf frame usually comprises a plurality of leaf profiles, which are joined to one another and enclose and hold the inserted pane.

In order to increase the light transmittance of windows further, the leaf profiles are provided with narrower and narrower widths. At the same time, the panes to be carried by the window leaf frames are chosen to be larger and larger in area, in order as a result to increase the light transmittance with the same window size. The result is improved brightness in the interior, which is a current trend and increases the comfort in rooms.

Furthermore, for energetic reasons, more frequently use is made of a structure as an insulating glass pane having three panes, instead of using only two panes, as was more usual earlier. This reduces the transfer of heat through the pane and is to be preferred for energetic reasons. However, this leads to higher pane and window leaf weights and, accordingly, to increased active forces, which have to be absorbed and passed on by window leaf frames that become narrower and narrower.

For this reason, window manufacturers recently bond the window leaf frame to the pane, so that the pane performs a proportion of the static function. However, this is carried out in a manner concealed in the area of the glass rebate overlap or the glass rebate. Use is currently made of wet adhesives that are to be applied, which are applied directly to the leaf profile where the pane is subsequently to be bonded. An application of an adhesive tape instead of the wet adhesive currently tends to be rejected, since the adhesive tape would have to be applied to the raw material, such as for example to the raw wood. For this purpose, a previously pre-treated workpiece of a limb of a window leaf frame would then have to be re-machined, in order to create a rough surface which would be suitable for the bonding. As a result, an additional operation would be necessary, which would complicate the manufacture. A machine for applying an adhesive tape is described, for example, by DE 689 04 098 T2.

However, the bonding of the pane with a wet adhesive is also associated with disadvantages, in particular for smaller companies, since the wet adhesive has to be processed under defined environmental conditions, that is to say at a pre-defined temperature and atmospheric humidity with a defined freeness from dust, and in addition the metering has to be performed very accurately. To apply this exactly by hand is virtually impossible and application systems to be used for the purpose are relatively expensive, which makes it uneconomical for small and medium companies.

SUMMARY OF THE INVENTION, OBJECT, SOLUTION, ADVANTAGES

The object of the invention is to devise a method by means of which bonding by means of an adhesive can be achieved simply and uncomplicatedly and the bonding can nevertheless be effected economically.

This object is achieved by the embodiments of the application detailed herein.

An exemplary embodiment of the invention relates to a method for machining a workpiece, in particular for a profiled leaf element of a window leaf frame, wherein the workpiece is first machined using a first machining device in order to produce a machined first surface to which an adhesive is to be applied, wherein the workpiece is machined further once the adhesive has been applied. Thus, the adhesive can be applied to a surface which in particular is machined to a final dimension, before the remaining surfaces of the workpiece are machined. This can advantageously also be automated and implemented simply in the machining process.

Here, it is particularly advantageous if the first machining for producing the first surface is carried out in such a way that the first surface is machined to a final dimension as a result. Thus, the adhesive can be applied to a surface which does not have to be machined further, since it has already been machined to final dimension. Here, the term machining means, for example, bringing to dimension by cutting or material removal, that is to say performing material removal in order to bring the workpiece to a predefined dimension at the machined point. This applies to the first machining and also to the further machining. These are accordingly shaping processes.

It is also advantageous if the first machining for producing the first surface also machines a second surface which is adjacent to the first surface, wherein the second surface is arranged in such a way that it corresponds substantially to a shadow area of the adhesive applied to the first surface. As a result, it is likewise possible to machine an adjacent surface which could not be machined during subsequent machining without damaging the adhesive already applied.

It is also advantageous in this case if the first machining for producing the second surface is carried out in such a way that the second surface is also machined to a final dimension as a result. In this respect, too, a further machining step that could impair the adhesive can thus be avoided.

According to the idea of the invention, it is advantageous if the further machining is machining of at least individual remaining surfaces of the workpiece to final dimension. Thus, following the application of the adhesive, the workpiece is then advantageously machined on remaining sides in a further machining device, in order to bring it overall to final dimension in order that, in following method steps, it can possibly be cleaned, surface-treated, such as for example painted, and assembled. Here, the surface treatment can advantageously also be or comprise a pre-treatment, such as an application of a primer, etc., for example.

Thus, in principle it is also possible that the further machining is carried out in one method step or in multiple method steps. Thus, depending on the requirement for machining various surfaces of the workpiece, the latter is machined successively by means of various tools.

It is also advantageous if the first machining is carried out on a planing machine or milling machine. Thus, by means of the planing machine or the milling machine, pre-machining of various surfaces of the workpiece can be carried out and, at the same time, the machining of the first surface and optionally of the second surface can also be performed.

It is also particularly advantageous if the further machining is carried out on a second machining device, such as in particular on a milling machine, and in particular on a profiling machine or on a machining center. As a result, the first machining can be carried out on a first machining device and the further machining on a separate further, second machining device, so that the first machining device then becomes free again for the machining of the next workpiece.

It is also particularly advantageous if, following the production of the first surface and before the application of the adhesive, the workpiece or the first surface of the workpiece is cleaned by means of a cleaning device. As a result, the first surface can be freed of dust and/or chips etc., so that applying the adhesive is then uncomplicated and reliably possible. Before the application of the adhesive, a pre-treatment can also advantageously be carried out, such as the application of a primer or the like.

It is also expedient if the application of the adhesive is carried out automatically by a laminating device or an application device. As a result, reliable application of the adhesive can be achieved. As an alternative thereto, a manual application can also be advantageous if the application is in particular carried out in accordance with treatment instructions and is carried out at the necessary points.

It is particularly advantageous if the first machining device and the laminating device or application device are coupled or connected to one another, in order to combine the production of the first surface and the application of the adhesive to the first surface with one another. As a result, this can be carried out in one pass, so to speak, which simplifies the method.

In addition, the laminating device or application device and the second machining device can alternatively or additionally be coupled or connected to one another, in order to combine the application of the adhesive to the first surface and the further machining of the workpiece with one another. This can also have advantages in the procedure, with increased effectiveness, since the handling and possibly the temporary storage of the workpieces in between can be dispensed with.

According to the idea of the invention, it is advantageous if the adhesive has or is an adhesive tape. This can be rolled on or applied in another way. The adhesive tape can also be additionally provided with an adhesive compound which, following the application of the adhesive tape, can be applied at least in some areas.

It may also be advantageous if the adhesive has or is an adhesive compound which, in particular, is a pasty or fluid adhesive compound. This can advantageously be applied to previously designated positions. The application can be carried out, for example, by means of a nozzle as a spray. In addition, the adhesive compound or the adhesive can be applied by means of an injector, cylinder, roller or in another way. The compound can also only be activated later, for example, so that it is adhesive only after the activation. Thus, the adhesive tape can also have windows, for example, in which the adhesive compound is introduced, so that the adhesive compounds can also be used in addition to the adhesive tape.

It is also advantageous if the workpieces are at least partly miter-sawn or miter-milled and mitered to one another. As a result, a simple connection can be implemented which, on account of the bonding with a pane, also leads to a sufficient overall stability, since the pane itself contributes to the stability.

Further advantageous refinements are described by the following figure description and by the sub-claims.

BRIEF DESCRIPTION OF THE DRAWINGS

In the following, the invention will be explained in more detail on the basis of at least one exemplary embodiment and by using the drawings, in which:

FIG. 1 shows a schematic illustration of a workpiece for a leaf profile of a window leaf frame before the first machining, FIG. 2 shows a schematic illustration of the workpiece for a leaf profile of a window leaf frame according to FIG. 1 after the first machining and after the application of the adhesive strip, FIG. 3 shows a schematic illustration of a workpiece according to FIG. 2 additionally with an illustration of a profile of an end contour mill, and FIG. 4 shows a block diagram to explain the method according to the invention.

PREFERRED EMBODIMENT OF THE INVENTION

FIG. 1 shows a workpiece 1 in cross section. The workpiece 1 in the exemplary embodiment of FIG. 1 is formed so as to be substantially rectangular or alternatively square in section and, in the longitudinal direction, not illustrated here, has an elongated rod-like shape. In addition, rebates already provided and otherwise introduced can be provided in the workpiece.

The workpiece 1 is used after the machining for example as a limb or leaf profile of a window leaf frame, which can be assembled to form a window leaf frame and which can then be bonded to a pane of the window leaf.

Before its machining, the workpiece 1 advantageously has four peripheral side surfaces 2, 3, 4 and 5, which are subsequently machined.

FIG. 2 shows the workpiece 1 after first machining in the area of the side surfaces 2 and 5. The workpiece 1 is first machined by means of a first machining device in order to produce a machined first surface 6 for the application of an adhesive tape 7 to the first surface 6.

In the exemplary embodiments, the method according to the invention will be described by using the application of an adhesive tape, wherein an alternative adhesive can also be applied instead of the adhesive tape. The adhesive can generally be the adhesive tape or else an adhesive compound which is applied. Also, in addition to an adhesive tape, an adhesive compound can also be applied. This applies in a corresponding way to all the exemplary embodiments described in the present application documents and will not be explicitly repeated once more below.

The first surface 6 is formed substantially parallel to the side surfaces 3, 5 and is substantially perpendicular to the side surface 2. The first machining for producing the first surface 6 is carried out in such a way that the first surface 6 is machined to a final dimension as a result.

Thus, the adhesive tape 7 can be applied to the first surface 6, so that it is bonded on securely.

It can also be seen that the first machining for producing the first surface 6 also machines a second surface 8, which is adjacent to the first surface 6, wherein the second surface 8 is arranged in such a way that it substantially corresponds to a shadow area of the adhesive tape 7 bonded onto the first surface 6. The second surface 8 is arranged to be substantially perpendicular to the first surface 6 and has a height h which is at least somewhat larger than the height H of the applied adhesive tape 7. The first machining for producing the second surface 8 is also implemented in such a way that, as a result, the second surface 8 is also machined to a final dimension. This is advantageous, since as a result it is possible to avoid subsequent machining of the first surface 6 and also of the second surface 8, during which the applied adhesive tape 7 could be damaged or impaired.

It can also be seen that, above the second surface 8, the side surface 2 is machined as far as the side surface 5 as a surface 9. However, this can be carried out only to a rough dimension of a pre-profile, so that this surface 9 is possibly machined later to an end dimension in a following machining step. Optionally, however, this surface 9 can also be machined to final dimension as part of the second surface 8.

FIG. 2 shows the final dimension 10, 11, 12 to which the workpiece 1 is brought during further machining. This is carried out following the application of the adhesive tape 7 to the first surface 6.

The further machining can be machining of at least individual remaining surfaces of the workpiece to final dimension, wherein the further machining is carried out in one method step or in multiple method steps. FIG. 3 shows, following the application of the adhesive tape 7, that the left-hand side of the workpiece 1 in the areas of the final dimension 11, 12, is machined to its final dimension by means of an end profile mill 13. Then, by means of a further end profile mill, the right-hand side of the workpiece 1 can also be machined finally in the area of the final dimension 10. However, this is not illustrated.

According to the idea of the invention, the first machining is carried out on a first machining device 14, which is constructed as a planing machine or as a milling machine.

The further machining is advantageously carried out on a second machining device 15, such as in particular on a milling machine, which is constructed in particular as a profiling machine or as a machining center. This is illustrated in FIG. 4 in the form of a block diagram 20.

Following the production of the first surface and before the application of the adhesive tape 7, the workpiece 1 or the first surface 6 of the workpiece 1 is cleaned by means of a cleaning device 16. This can be blowing off dust or chips. It can also be another type of cleaning.

Following the cleaning, the adhesive tape 7 is applied. It is advantageous if the application of the adhesive tape 7 is carried out automatically by a laminating device 17. In the event of a different application of the adhesive, instead of a laminating device 17 a general application unit 17 can also be provided, by means of which the adhesive can be applied.

According to the idea of the invention, it is advantageous if the first machining device 14 and the laminating device 17 or application device 17 are coupled or connected to one another, in order to combine the production of the first surface 6 and the application of the adhesive tape 7 to the first surface 6 with one another. Alternatively, this coupling can also be omitted.

Alternatively or additionally, the laminating device 17 or application device 17 and the second machining device 15 can be coupled or combined with one another, in order to combine the application of the adhesive tape 7 to the first surface 6 and the further machining with one another. Alternatively, this coupling can also be omitted.

The laminating device or application device 17 can both apply an adhesive, which is an adhesive compound, an adhesive tape or else an application of an adhesive tape and an adhesive compound. Different adhesives can also be provided. The adhesive or adhesives can, for example, also be covered by means of a protective film or the like. The application device can not only apply an adhesive tape, such as rolling on by means of rollers, it can alternatively or additionally also roll the adhesive on by means of rolls or apply the same by means of spraying, and also apply the same by means of nozzles.

The machined workpieces can advantageously be assembled to form a window frame or a window leaf frame or the like. It is also advantageous if the workpieces are miter-sawn or miter-milled at at least one of their ends, in order to miter two workpieces to one another. Other types of connection can also be chosen, so that the workpieces butt up against one another and, for example, are mortised or joined in another way. However, cutting to length and miter-sawing is associated with the advantage that simple processing and adaptation of the workpieces to be connected is carried out; as a result of the bonding of a pane, this also contributes to the stability and the assembled frame does not need to be designed so strongly in terms of its stability.

LIST OF DESIGNATIONS

1 Workpiece
2 Side surface
3 Side surface
4 Side surface
5 Side surface
6 First surface
7 Adhesive tape
8 Second surface
9 Surface
10 Final dimension
11 Final dimension
12 Final dimension
13 End profile mill
14 First machining device
15 Second machining device
16 Cleaning device
17 Laminating device, application device
20 Block diagram

The invention claimed is:

1. A method for machining a workpiece for a profiled leaf element of a window leaf frame, the method comprising:
   in a first step, machining the workpiece using a first machining device to produce a machined first surface and a machined second surface,
   in a second step, applying an adhesive to the first surface,
   in a third step, machining the workpiece further using a second machining device after applying the adhesive,
   wherein the second surface is adjacent to the first surface,
      wherein the second surface is arranged such that it corresponds substantially to a shadow area of the adhesive applied to the first surface, wherein the shadow area of the adhesive is an area on the second surface which would be obscured by the adhesive when viewing the second surface from an orthogonal vantage point.

2. The method as claimed in claim 1,
   wherein the first step is carried out in such a way that the first surface is machined to a final dimension as a result.

3. The method as claimed in claim 2,
wherein the first step is carried out in such a way that the second surface is machined to a final dimension as a result.

4. The method as claimed in claim 1,
wherein the third step includes machining of at least individual remaining surfaces of the workpiece to final dimension.

5. The method as claimed in claim 4,
wherein the third step is carried out in one machining operation or multiple machining operations.

6. The method as claimed in claim 1,
wherein the first step is carried out on a planing machine or a milling machine.

7. The method as claimed in claim 1,
wherein the third step is carried out on a profiling machine or on a machining center.

8. The method as claimed in claim 1,
wherein, between the first and second steps, the method further comprises cleaning the first surface of the workpiece is pre-treated or cleaned using a cleaning device.

9. The method as claimed in claim 1,
wherein the second step is carried out automatically by a laminating device or an application device.

10. The method as claimed in claim 9,
wherein the first machining device and the laminating device or application device are coupled or connected to one another, in order to combine the production of the first surface and the application of the adhesive to the first surface with one another.

11. The method as claimed in claim 9,
wherein the laminating device or application device and the second machining device are coupled or connected to one another, in order to combine the application of the adhesive to the first surface and the further machining with one another.

12. The method as claimed in claim 1,
wherein the adhesive has or is an adhesive tape.

13. The method as claimed in claim 1,
wherein the adhesive has or is an adhesive compound which is a pasty or fluid adhesive compound.

14. The method as claimed in claim 1,
wherein the workpiece is at least partly miter-sawn or miter-milled to permit the workpiece to be mitered to a second workpiece.

* * * * *

UNITED STATES PATENT AND TRADEMARK OFFICE
CERTIFICATE OF CORRECTION

PATENT NO.         : 10,604,987 B2
APPLICATION NO.    : 15/553621
DATED              : March 31, 2020
INVENTOR(S)        : Volker Schmieder Page 1 of 1

It is certified that error appears in the above-identified patent and that said Letters Patent is hereby corrected as shown below:

On the Title Page

Item (86) the PCT Number should read as follows:
-- PCT/EP2016/055512 --

Signed and Sealed this
First Day of September, 2020

Andrei Iancu
*Director of the United States Patent and Trademark Office*